A. B. LANDIS.
CUTTER HEAD.
APPLICATION FILED JAN. 26, 1907.
948,888.
Patented Feb. 8, 1910.
3 SHEETS—SHEET 1.
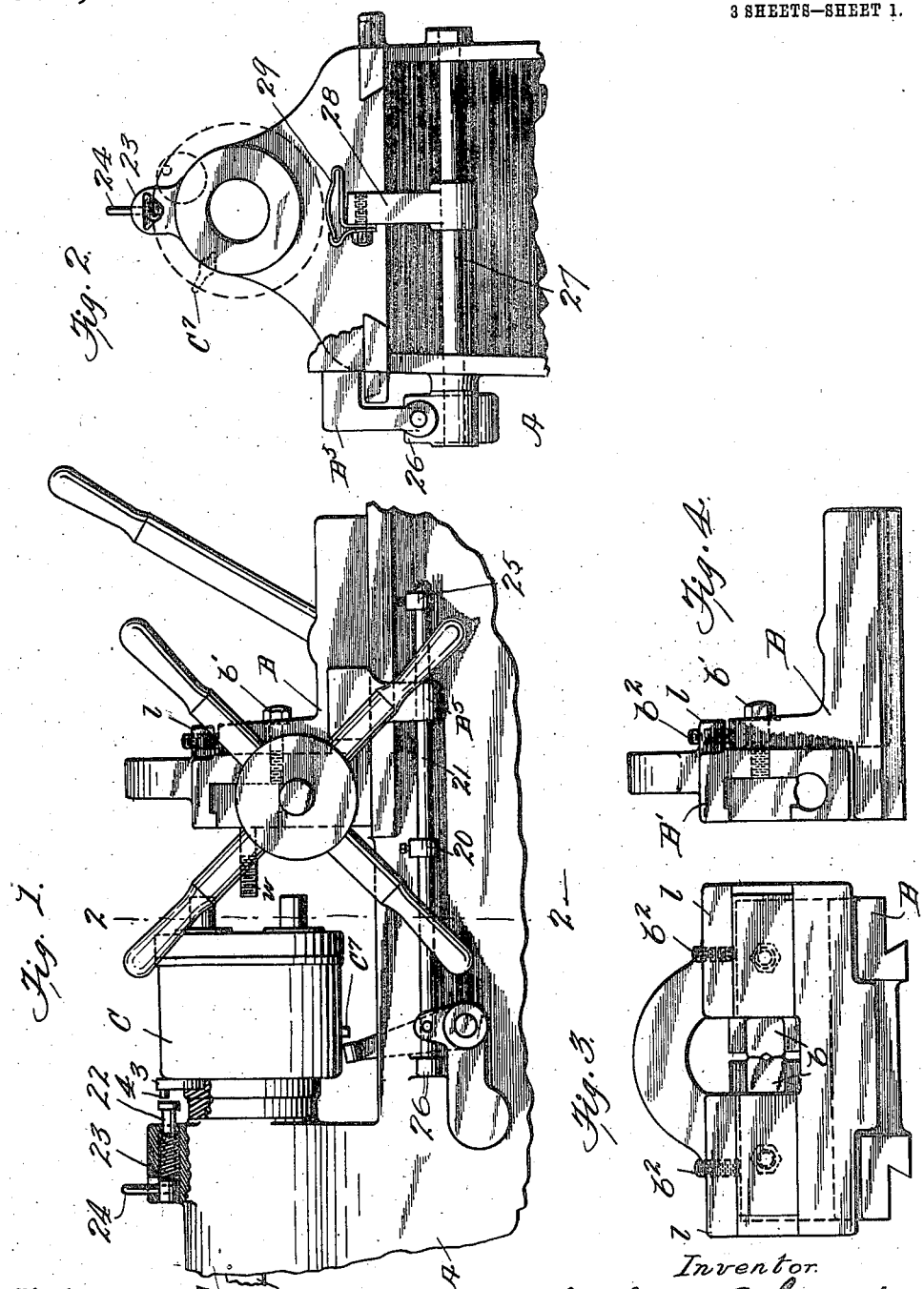

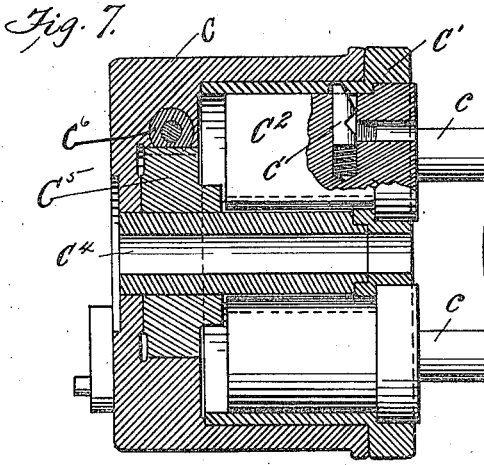
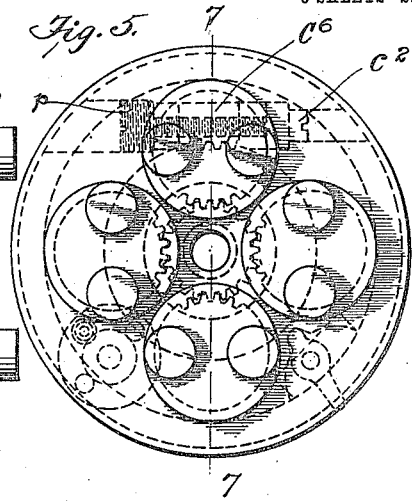
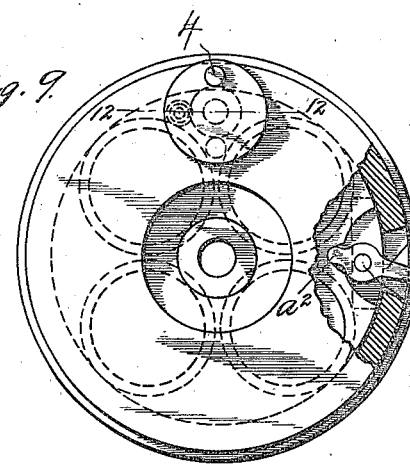
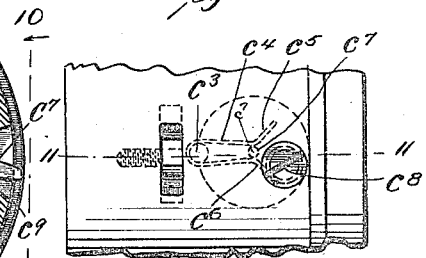
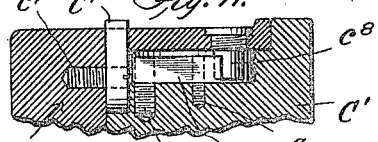
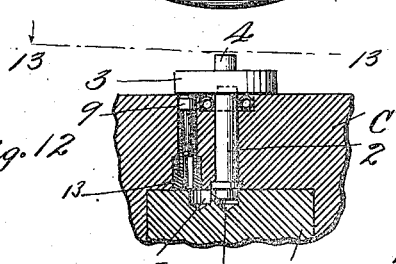
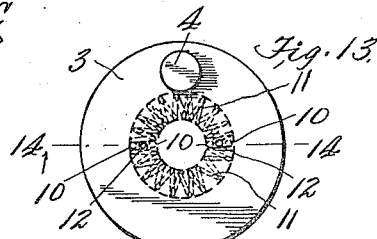
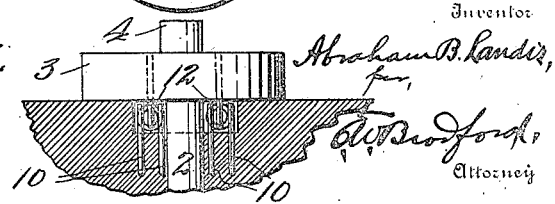

A. B. LANDIS.
CUTTER HEAD.
APPLICATION FILED JAN. 26, 1907.
948,888.
Patented Feb. 8, 1910.
3 SHEETS—SHEET 3.
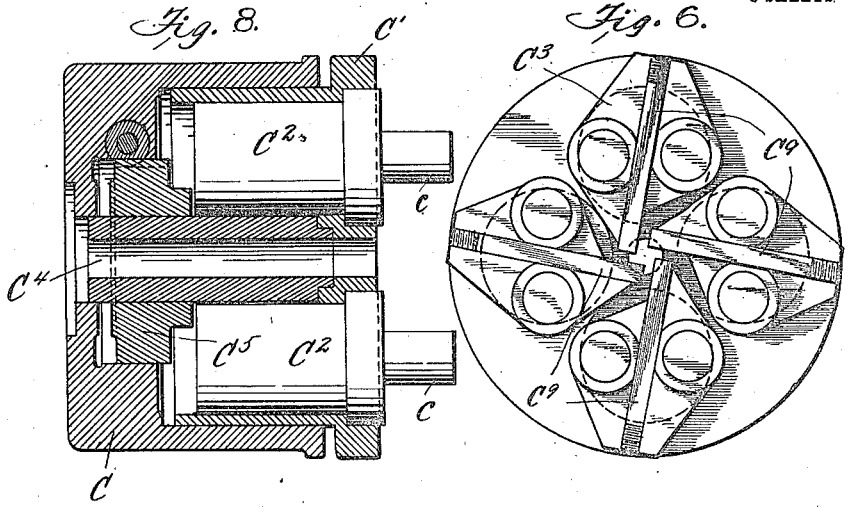
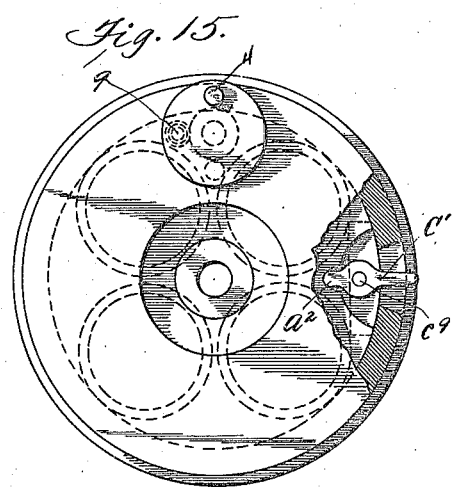
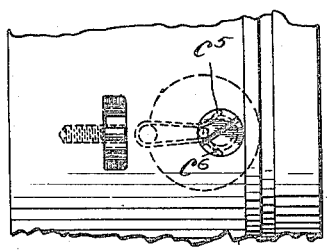
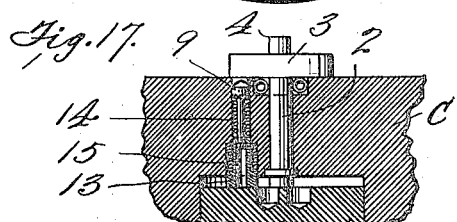
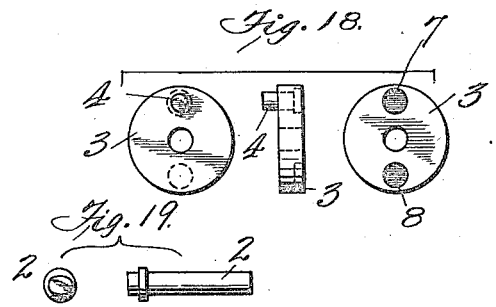
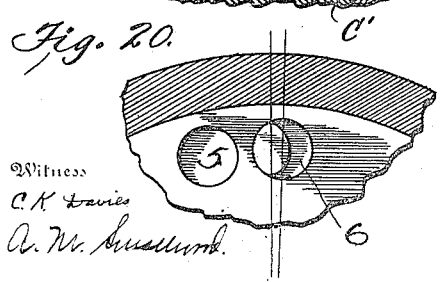
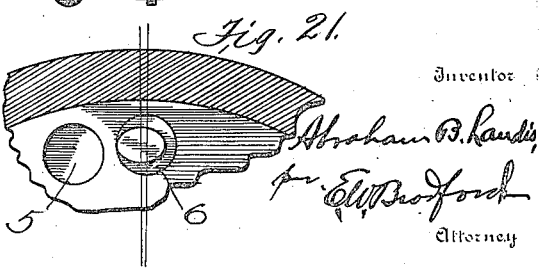

UNITED STATES PATENT OFFICE.

ABRAHAM B. LANDIS, OF WAYNESBORO, PENNSYLVANIA.

CUTTER-HEAD.

948,888. Specification of Letters Patent. Patented Feb. 8, 1910.

Application filed January 26, 1907. Serial No. 354,332.

*To all whom it may concern:*

Be it known that I, ABRAHAM B. LANDIS, a citizen of the United States, residing at Waynesboro, in the county of Franklin and State of Pennsylvania, have invented certain new and useful Improvements in Cutter-Heads, of which the following is a specification.

My said invention consists in certain improvements in the details of construction and arrangement of parts of cutter-heads for machines for cutting threads on bolts, screws, etc., of that general character shown in my former patents Nos. 690,300 and 409,208, whereby the construction is simplified and rendered more positive in operation and result, all as will be hereinafter more fully described and claimed.

Referring to the accompanying drawings which are made a part hereof and on which similar reference characters indicate similar parts, Figure 1 is a side elevation of a portion of the bed of a screw cutting machine showing the cutter-head and work carrying table in the position they occupy in such a machine, Fig. 2 a view looking in the direction indicated by the arrows from the dotted line 2—2 in Fig. 1, the cutter-head being indicated by dotted lines, Fig. 3 a front elevation of the work holding carriage, separate from the machine, Fig. 4 a side elevation thereof, Fig. 5 a front elevation of the cutter-head with the cutter-holders omitted, Fig. 6 a similar view with the cutter-holders in position, Fig. 7 a longitudinal section through the cutter-head on the dotted line 7—7 in Fig. 5, the parts being shown in the position as when the die is closed for operation, Fig. 8 a similar view showing the parts in the position they occupy when the die is open, Fig. 9 a rear elevation of the cutter die with the parts as when the die is closed, Fig. 10 a detail view looking in the direction indicated by the arrows from the dotted line 10—10 in Fig. 9, Fig. 11 a detail sectional view on the dotted line 11—11 in Fig. 10, Fig. 12 a detail section on the dotted line 12—12 in Fig. 9, Fig. 13 a detail view on an enlarged scale looking in the direction indicated by the arrows from the dotted line 13—13 in Fig. 12, Fig. 14 a cross section looking in the direction indicated by the arrows from the dotted line 14—14 in Fig. 13, Figs. 15, 16 and 17 are views similar to Figs. 9, 10 and 12 except the parts are shown in the position they occupy when the die is open instead of when it is closed, and Figs. 18, 19, 20 and 21 detail views illustrating more clearly the particular form of specific parts.

In said drawings the portions marked A represent the bed of the machine, B the work holding carriage and C the cutter head casing or frame.

The bed A may be any suitable bed for a machine of the character mentioned, provided with bearings for the cutter-head spindle and ways for the work holding carriage and the necessary bearings and supports for the various parts of the mechanism.

The work supporting carriage B is mounted upon ways on the carriage and adapted to be operated back and forth by any suitable gearing and comprises a suitable frame or support B' for the work-holding jaws $b$. Said part B' is adjustably mounted on an upright portion of the carriage B, by means of set-screws $b'$ which project through holes larger than said set-screws in said upright part and into screw-threaded perforations in said part B', thus providing that said part B' may be adjusted both vertically and transversely and firmly clamped to said carriage. Set-screws $b^2$ project through an overhanging ledge 1 on the rear edge of said part B' and bear upon the top edge of said upright part of the carriage B, thus furnishing adjustable supports for said part B', to so hold it in the proper vertical adjustment that the jaws $b$ will be in position to clamp the work in true alinement with the cutter die.

The cutter-head C is mounted upon a spindle 1 in suitable bearings $A^9$ on the top of the frame or bed A, and comprises an outside hollow casing with an open front end adapted to receive an inner casing C', which is mounted to have a limited longitudinal movement therein. Said inner casing C' is formed with four longitudinal perforations around its axis, arranged equal distance apart, forming seats adapted to contain the cylinders $C^2$, which are provided with projecting pins $c$ on their front ends for carrying the cutter holders $C^3$. Said cylinders $C^2$ are secured in their respective seats in the casing C' by means of spring pawls $c'$ mounted in transverse sockets therein adapted to engage with notches in the walls of their seats in said casing C', as most plainly shown in Fig. 7. Said casing C' is formed with a central perforation which cuts into each of said cylinder seats, and a small section of each of the adjacent faces of said cylinders projects into said central perforation and is formed with gear teeth thereon, which are adapted to engage with gear teeth formed on the outside of a cylinder $C^4$, which extends through said central perforation, being mounted at its rear end in a bearing in the head of casing C and at its forward end in a bearing formed in the front end of casing C'. A wheel $C^5$ is mounted on said cylinder near its rear end and is provided with teeth on its periphery which are adapted to engage with a sliding rack-bar $C^6$ mounted in a transverse way formed in the head of casing C and adapted to be operated back and forth by means of a screw $c^2$, by which means said wheel $C^5$ and cylinder $C^4$ may be rocked back and forth and through its connection with the teeth on the adjacent sides of cylinders $C^2$, said cylinders may be turned slightly to adjust the size of the cutter die, as will be readily understood. The head of screw $c^2$ is shouldered and is inserted from the large end of the transverse way in casing C, after being inserted through the rack $C^6$, as shown in Fig. 5 by dotted lines, the shoulder abutting against a shoulder in said way, the large end of which is closed by a screw plug $p$.

In one side of casing C' is formed a circular recess, as indicated most plainly in Figs. 10, 11, and 16, in which is mounted upon a stud $c^3$ a stiff double leaf-spring $c^4$, the two branches of which have their front ends $c^5$ and $c^6$ formed with tapered faces which extend at an angle from each other, with a stud $c^7$ interposed between said branches at the point of the angle, as shown. A stud $c^8$ is mounted in the wall of the casing C and its inner end projects to between the points $c^5$ and $c^6$ of said spring $c^4$. A lever $C^7$ is mounted on a pivot bolt or stud $c^9$ in casing C at one side of the recess, its inner end being adapted to engage with a notch in said casing C' so that as said lever $C^7$ is thrown back and forth upon its pivot it will rock said casing C' within said casing C.

At a point substantially midway between two of the cylinders $C^2$ a short shaft 2 is journaled in a bearing in the head of casing C having a crank-wheel 3 on its outer end provided with a crank pin 4 projecting therefrom. Its inner end is formed elliptical in shape, as shown most clearly in Figs. 19, 20 and 21, and is adapted to engage with either one or the other of sockets 5 and 6 in the end of casing C', adjacent thereto. Wheel 3 has two sockets 7 and 8 formed on its underside diametrically opposite each other and a spring pawl 9 is mounted in a socket alongside of shaft 2 normally midway between sockets 7 and 8 as indicated by dotted lines in Fig. 15, and adapted to engage with one or the other of said sockets and lock said shaft in a position to hold the shaft 2 in the position shown in Fig. 21, as will be presently described. Around the outer end of said shaft 2 is formed a circular groove in the head of casing C under the wheel 3, which groove is divided into two equal portions by means of studs or pins 10 set therein at diametrically opposite points, forming semicircular pockets. Coiled springs 11 are mounted in said pockets between said pins 10 on both sides thereof and a stud or pin 12 is mounted in the underside of wheel 3, one on each side thereof, in position to project between the ends of said springs 11 and between the studs or pins 10. Said springs thus serve to normally hold the wheel 3 and the shaft 2 with its elliptical or cam-shaped inner end in normal position, as shown in Fig. 20.

The spring pawl 9, consists of a head with a tapered point adapted to engage with one of the sockets 7 or 8 in wheel 3, and a stem mounted to telescope within a tubular part 13, which is mounted in an enlarged section at the inner end of the socket formed in said part C to contain said pawl. A coiled spring 14 is mounted around the stem on said pawl 9 between its head and the inner end of said part 13. Another coiled spring 15 is mounted between a shoulder formed near the inner end of said part 13 and the shoulder at the inner end of the enlarged section of the socket, as shown most clearly in Figs. 12 and 17. Thus as the casing C' moves outward in a longitudinal direction within casing C, as shown in Fig. 17, the spring 15 will operate to cause tubular part 13 to follow casing C' and draw the pawl 9 out of engagement with wheel 3, when springs 11 will return wheel 3 to normal position, as shown in Fig. 20. When the parts are closed, as shown in Fig. 12, spring 14 is compressed by the end of the part 13 sliding over the stem of pawl 9 so that said pawl is forced by the pressure of said spring under its head outwardly to bear against the wheel 3 in position to spring into one of the sockets 7 or 8, therein, when brought to position to register therewith.

In operation the cutters $C^9$ being in the position in the cutter holders $C^3$, as shown in Fig. 6, and as shown in my other patents above referred to, and the cutter-head C and work holding carriage B being in the respective positions on the machine as shown in Fig. 1, the die being closed and the cutter-head in rapid rotation, as is well understood, the operator forces the work holding carriage B, carrying the work W, forward into the die, which serves to cut the thread thereon for the distance desired. When the carriage B has been advanced to the point required to secure the length of cut desired on the bolt or screw, an arm $B^5$ on said carriage will contact with an adjustable stop 20 on a rod 21, which stop is fixed to limit the movement of said carriage at the required position. The inner end of said rod 20 abuts a lug 26 on bed A and holds the carriage stationary. The die continuing to cut on the work $w$ the inner part $C'$ of the casing, carrying the four cylinders and the cutters, is drawn out from the position shown in Figs. 7 and 12 to that shown in Figs. 8 and 17. As soon as the parts are separated the pin 2 is released from its engagement with socket 5 or 6, and the spring $c^4$ aided by the action of cutting force operates to turn part $C'$ from the closed position shown in Fig. 10 to the open position shown in Figs. 16 and 17 and through the central gear $C^4$ operates to rock cylinders $C^2$ and open the die, when the work may be withdrawn. Said spring $c^4$ operates as follows: When the parts C and $C'$ are locked together to hold the die closed it occupies the position in relation to pin $c^8$ as shown in Figs. 10 and 11, in which position said pin $c^8$ is out of line with the central line of said spring and bears upon the lower leaf thereof. Said spring is thus exerting its tension upon the lower side of said pin $c^8$ while the die is closed. Therefore, immediately upon the end of shaft 2 being withdrawn from socket 6, the lower inclined part $c^6$ of said spring $c^4$ will at once, by reason of its spring force exerted against the side of pin $c^8$, turn the casings C and $C'$ to bring them into relation so that said pin $c^8$ will be in line with the pin $c^7$. The tension of the spring against said pin $c^8$ is largely increased during the operation of drawing casing $C'$ longitudinally of casing C, as this movement carries said spring outward with part $C'$ so that its lower leaf is sprung outward over said pin, as will be readily seen. The turning of casing $C'$ serves to turn the cylinders $C^2$ carired in casing $C'$ slightly around the toothed cylinder $C^4$ and operates to open the die which is held open by the inner end of shaft 2 resting on the end of casing $C'$ at one side of the sockets 5 and 6, as shown in Fig. 17. The carriage is then run back by the operator until the arm $B^5$ contacts with another strike 25 adjustably fixed on the rear end of rod 21, which rod is pivotally connected to the upper end of a bell-crank lever 26 which is mounted on a cross shaft 27, its other end being weighted, as shown. This serves to rock said shaft to throw a central arm 28 thereon into position so that a spring contact face 29 on its upper end will be in the path of lever $C^7$ projecting from one side of the cutter-head C. As said cutter-head revolves and lever $C^7$ contacts with said spring 29 said lever is thrown to turn the casing $C'$ back to first described position to close the die, and bring the inner end of shaft 2 in position to register with the appropriate socket 5 or 6. The pin $c^8$ being, by this movement of part $C'$, thrown downwardly across the inclined face $c^6$ of spring $c^4$, said spring acting against said pin, will tend to slide the part $C'$ back to the position shown in Fig. 7 and at the same time cause the inner end of shaft 2 to engage with the appropriate socket in part $C'$ and lock it firmly in its normal position. Spring $c^4$ thus operates to close the parts C and $C'$ and the socket 6 of said part $C'$ passes over the elliptical end of shaft 2 and the parts C and $C'$ are thus again locked against independent rotary motion and the die is held closed for the next operation. When it is desired to make a second, or "finishing" cut on the screw, the operator runs the carriage back and at the same time pushes a sliding trip 22, mounted in a suitable socket 23 on the top of casing A forward, by means of a handle 24, into the path of the crank-pin 4 on the wheel 3. As said crank-pin comes around in position to hit said trip it operates to give wheel 3 a quarter turn, which turns the elliptical inner end of shaft 2 from the position shown in Fig. 20 to that shown in Fig. 21 and brings one of the sockets 7 or 8 to position to receive pawl 9 and lock wheel 3 in this position, which slightly closes the die for said "finishing" cut, the operation serving to rock part $C'$ slightly and through central gear $C^4$ to turn the cylinders $C^2$ to close up the die for said second or "finishing" cut. As soon as the die is opened, as before described, the pawl 9 falls out of engagement with wheel 3 and springs 11 return shaft 2 to its normal position.

Presuming that the operation, and the position of parts just described, are arranged for the cutting of a right hand thread, when it is desired to cut a left hand thread the normal locked position of the parts C and $C'$ will be changed to bring the socket 5 in part $C'$ to register with the inner end of the shaft 2, instead of the socket 6 as shown in Figs. 20 and 21. The cutter holders are changed so as to operate with the cutter head revolving in the reverse direction, when the operation will be as above described for opening and closing the die and holding it closed during the operation.

The adjustment of the rack-bar $C^6$ by means of the screws $c^2$ will adjust the fixed closed position of the cutters composing the die in relation to each other, so as to secure the size of die required for the work to be done. By adjusting the jaw holding head or frame $B'$, by the means before described the work can be brought into true alinement with the cutter-head and thus most perfect results accomplished.

Having thus fully described my said invention, what I claim as new and desire to secure by Letters Patent, is:—

1. A cutter-head comprising a casing formed in two parts, one mounted within the other and arranged to have a limited rotary and longitudinal movement independent of each other, a locking device mounted in one part and adapted to engage with the other and arranged to hold said parts from independent rotary movement when in locked position, and a spring secured to one part and bearing against the other part arranged to force and normally hold said two parts in closed position, substantially as set forth.

2. A cutter-head comprising a casing composed of two parts, one mounted within the other, the inner part being formed with sockets to receive the cutter-holding cylinders, said cutter-holding cylinders mounted in said sockets and formed with teeth on their adjacent faces, a central cylinder in said outer part containing teeth on its periphery adapted to mesh with the teeth on the adjacent faces of said cutter-holding cylinders, means for adjusting and securing said central cylinder, means for locking said two parts of the casing against independent rotary movement when in closed position, and a spring mounted in a recess between the walls of said two parts adapted to bear against said parts to normally close them when the locking device is in position for engagement, substantially as set forth.

3. In a cutter-head, the combination of the outer casing mounted on the spindle, the inner casing mounted within said outer casing, and containing the sockets for the cutter-holding cylinders, said cutter-holding cylinders, the cutters mounted thereon, means for holding said cylinders in a fixed relation to secure the size of the die desired, and means for opening and closing said die comprising a spring mounted in a recess between said two parts of the casing adapted when the locking means is released to impart a limited rotary movement to the inner casing to open the die, and to slide the two parts together when the locking device is in position for engagement, substantially as set forth.

4. In a thread-cutting machine, the combination, of the casing composed of an outer part and an inner part mounted to have a limited rotary and longitudinal movement, a locking device for securing said two parts when closed against independent rotary movement comprising a shaft carrying a cam shaped inner end adapted to engage with a socket in the end of said inner part, means for rocking said shaft, means for sliding the inner casing longitudinally to free said locking device from said socket means for returning said inner part to normal position and locking it, the cutter holding cylinders mounted in said inner part, and the cutters carried by said cylinders, all mounted and arranged substantially as set forth.

5. In a thread-cutting machine, the combination, of the casing comprising an outer and an inner part formed and arranged to have a limited independent rotary and longitudinal movement, the cutter holding cylinders mounted in sockets in said inner part formed with teeth upon their adjacent edges, a central toothed cylinder adapted to engage with said teeth and hold said cylinders in fixed relative position, means for locking the two parts of said casing against independent rotary movement, means for releasing said locking device, and means for imparting a limited rotary movement to the inner part of the casing carrying the cutter holding cylinder immediately upon the release of said locking device, whereby the die is automatically opened, substantially as set forth.

6. In a thread-cutting machine, the combination of a casing composed of two parts, one mounted within the other, and having a limited independent rotary and longitudinal movement, said inner part formed with sockets to contain the cutter holding cylinders, said cutter holding cylinders formed with teeth on their adjacent sides, a central toothed cylinder meshing with said teeth on said cutter holding cylinders, means for adjusting said central cylinder to adjust the relative position of said cutter holding cylinders and thus adjust the size of the die, means for locking the two parts of said casing when closed against independent rotary movement, means for releasing said locking device at the end of each cutting operation, means for imparting a limited rotary movement to the inner part of the casing when said locking device is released, whereby said die is opened, means for forcibly returning said inner part to the position to close said die, and means for automatically throwing it into engagement with the locking device when brought to this position, substantially as set forth.

7. In a thread-cutting machine, the combination, of the casing comprising the outer part, the inner part mounted therein to have a limited independent rotary and longitudinal movement, said inner part having sockets for the cutter holding cylinders, said cutter holding cylinders mounted therein, means for holding said cylinders in fixed relative positions, the cutter holders, the cutters mounted thereon to form the die, means for locking the two parts of the casing against independent rotary movement when in closed position, means for releasing said locking device, means for imparting a limited rotary movement to said inner part when said locking device is released, whereby the die is opened, and means for returning said parts to their closed position after the work has been withdrawn from said die, substantially as set forth.

8. In a cutter-head, the combination, of the casing formed in two parts, the inner part carrying the cutter holders, means for giving to said inner part a limited longitudinal and rotary movement, means for locking said two parts in closed position, and means for returning them to closed position after being opened, substantially as set forth.

9. In a cutter-head, the combination, of the casing composed of two parts mounted one within the other, the inner part mounted to have a limited longitudinal and rotary motion, means for locking said two parts in closed position, means for releasing the locking mechanism, means for imparting to the inner part a limited rotary movement when said locking mechanism is released, whereby the die is opened, means for returning said inner part to position, and means for forcibly engaging the locking mechanism, substantially as set forth.

10. In a thread-cutting machine, the combination, of the casing composed of an outer part mounted upon the spindle, an inner part mounted in said outer part to have a limited independent rotary and longitudinal movement, the cutter holding cylinders carrying the cutters composing the die mounted in said inner part, means for securing them in fixed relative positions, means for adjusting the size of the die as required, means for locking said two parts against independent rotary movement when closed, means for releasing the locking mechanism, means for imparting to the inner part of the casing an independent rotary movement when the locking mechanism is released comprising a leaf spring mounted in a recess in one side of the inner casing and formed with a tapered outer end adapted to bear against a fixed stud carried by the outer casing, said stud being to one side of the center of said spring when the parts are in locked position, whereby when the locking mechanism is released it tends to throw said stud to a central position and thus rotate said central part, substantially as set forth.

11. A cutter-head comprising a two part casing, one mounted within the other and adapted to have a limited independent rotary and longitudinal movement, means for locking said two parts against said independent rotary and longitudinal movement when closed, means for releasing the locking mechanism, means for imparting to one part an independent rotary movement when the locking mechanism is released comprising a leaf spring mounted in a recess in one side of the inner casing and formed with a tapered outer end adapted to bear against a fixed stud carried by the other part, said stud being on one side of said spring when the parts are in locked position, whereby when the locking mechanism is released said spring tends to throw said stud to a central position and thus rotate said other part, substantially as set forth.

In witness whereof, I have hereunto set my hand and seal at Washington, D. C., this 22nd day of January, A. D. nineteen hundred and seven.

ABRAHAM B. LANDIS. [L. S.]

Witnesses:
E. W. BRADFORD,
A. M. PARKINS.